United States Patent
Chen et al.

(10) Patent No.: US 10,776,993 B1
(45) Date of Patent: Sep. 15, 2020

(54) CONTINUOUS DEVICE POSE REPRESENTATION IN AR/VR DISPLAYS

(71) Applicant: Snap Inc., Santa Monica, CA (US)

(72) Inventors: Yiming Chen, San Diego, CA (US); Oliver Woodford, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/287,993

(22) Filed: Feb. 27, 2019

(51) Int. Cl.
G06T 15/20 (2011.01)
H04N 13/117 (2018.01)
G06F 3/01 (2006.01)
G06T 19/00 (2011.01)

(52) U.S. Cl.
CPC ............ *G06T 15/205* (2013.01); *G06F 3/011* (2013.01); *G06T 19/003* (2013.01); *H04N 13/117* (2018.05)

(58) Field of Classification Search
None
See application file for complete search history.

(56) References Cited

U.S. PATENT DOCUMENTS

| | | | |
|---|---|---|---|
| 9,940,553 B2 * | 4/2018 | Shotton | G06K 9/00671 |
| 10,565,802 B2 * | 2/2020 | Grossmann | G06T 19/00 |
| 2017/0345217 A1 * | 11/2017 | Chan | G06F 3/048 |
| 2018/0322688 A1 * | 11/2018 | Ozguner | G06T 7/32 |
| 2019/0034076 A1 * | 1/2019 | Vinayak | G06T 19/006 |
| 2019/0083885 A1 * | 3/2019 | Yee | G06T 15/20 |

OTHER PUBLICATIONS

Vandeportaele, Bertrand, et al. "Pose interpolation for rolling shutter cameras using non uniformly time-sampled b-splines." 2017.*

Li, Juan, et al. "A combined vision-inertial fusion approach for 6-dof object pose estimation." Seventh International Conference on Machine Vision (ICMV 2014). vol. 9445. International Society for Optics and Photonics, 2015.*

Lovegrove, Steven, Alonso Patron-Perez, and Gabe Sibley. "Spline Fusion: A continuous-time representation for visual-inertial fusion with application to rolling shutter cameras." BMVC. vol. 2. No. 5. 2013.*

Belongie, Serge, "Rodrigues' Rotation Formula", MathWorld—A Wolfram Web Resource, URL: http: mathworld.wolfram.com RodriguesRotationFormula.html, (accessed Feb. 19, 2019), 2 pgs.

(Continued)

*Primary Examiner* — Ryan M Gray
(74) *Attorney, Agent, or Firm* — Schwegman Lundberg & Woessner, P.A.

(57) ABSTRACT

Aspects of the present disclosure involve a system comprising a computer-readable storage medium storing a program and a method for determining orientation or location of a device. The program and method include receiving data from one or more sensors of a device; generating a first spline that represents location of the device in a world coordinate frame based on the data received from the one or more sensors; generating a second spline that represents orientation of the device in the world coordinate frame based on the data received from the one or more sensors; computing a motion model that represents motion of the device over a continuous time interval based on the first and second splines; and determining an expected location or orientation of the device based on the motion model.

19 Claims, 7 Drawing Sheets

(56) References Cited

OTHER PUBLICATIONS

Eade, Ethan, "Hermite Splines in Lie Groups as Products of Geodesics", Ethaneade.com, URL: http: ethaneade.com lie_spline.pdf, (May 28, 2017), 9 pgs.

Forster, Christian, "IMU Preintegration on Manifold for Efficient Visual-Inertial Maximum-a-Posteriori Estimation", Robotics: Science and Systems, Rome, IT, (Jul. 2015), 10 pgs.

Patron-Perez, Alonso, "A Spline-Based Trajectory Representation for Sensor Fusion and Rolling Shutter Cameras", Intl. Journal of Computer Vision, vol. 113, Issue 3, (Jul. 2015), 12 pgs.

Zhang, Pifu, "Navigation with IMU GPS Digital Compass with Unscented Kalman Filter", IEEE Intl. Conference on Mechatronics and Automation, Niagara Falls, CA, (Jul. 2005), 6 pgs.

* cited by examiner

US 10,776,993 B1

CONTINUOUS DEVICE POSE REPRESENTATION IN AR/VR DISPLAYS

TECHNICAL FIELD

The present disclosure relates generally to device pose measurements.

BACKGROUND

Virtual rendering systems can be used to create engaging and entertaining augmented reality experiences, in which virtual object graphics, such as avatars, appear to be present in the real world. Such systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real world. Such systems typically rely on device sensor measurements to determine motion of the device and to adjust the virtual object graphics.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
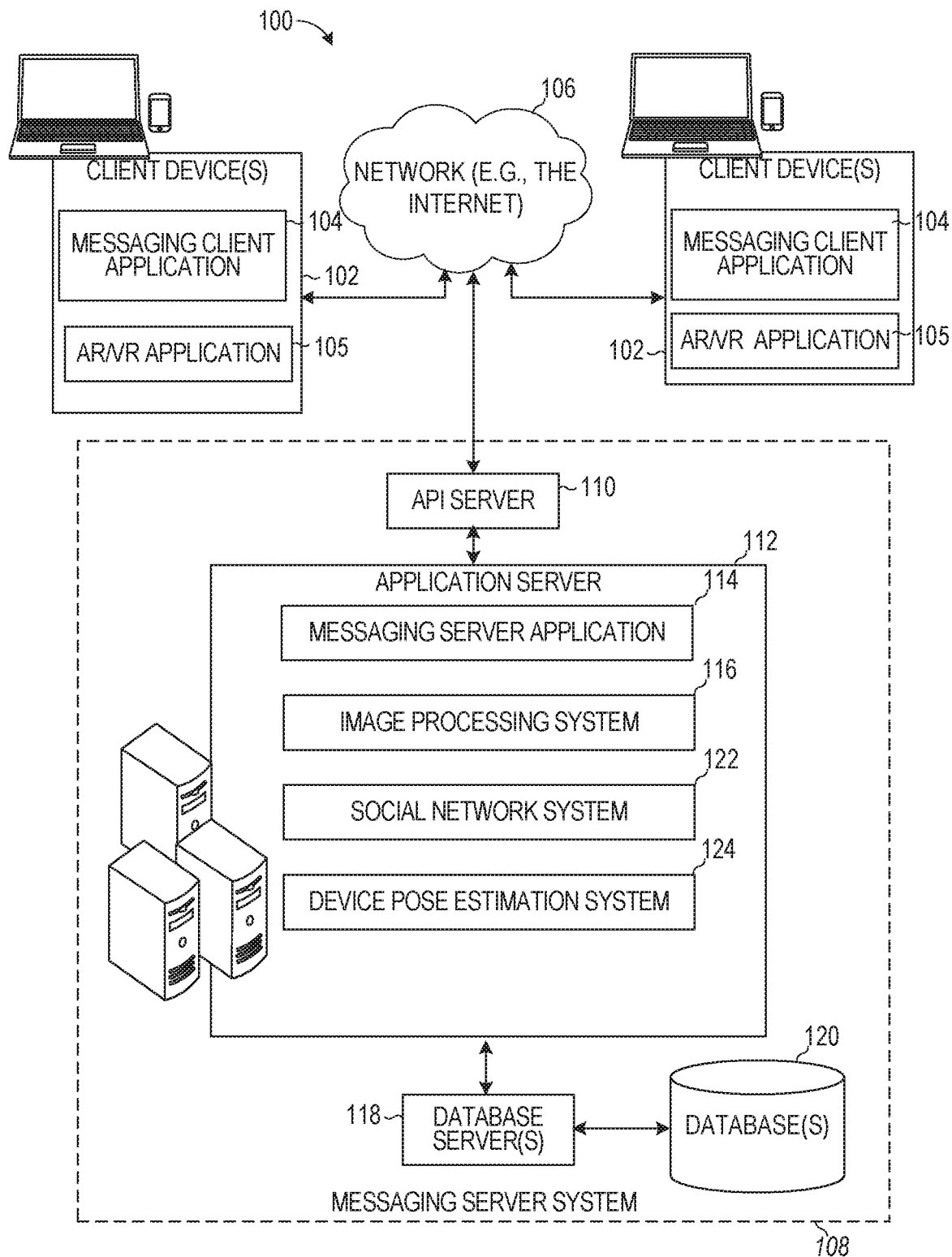
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical virtual reality (VR) and augmented reality (AR) systems display avatars or overlay and orient graphics on an image depicting a real-world scene captured by a camera. In order to accurately display the avatars and orient the graphics, such systems rely on accurate estimations of a position and orientation of a device in three-dimensional (3D) space. Estimation of the position and orientation of the device is typically determined by integrating derivative measurements (such as acceleration and velocity) or by generating a single spline on the SE(3) manifold.

For example, the integrated derivative measurements can be used to compute a probability distribution over the device pose at a moment in time. While such integration-based approaches work well for determining the device pose in some cases, the approximation of the shape of the pose distribution and the requirement to twice integrate sensor measurements introduces complexities and errors. Also, the single-spline-based approach fuses inertial measurement unit (IMU) data to generate a single spline on the SE(3) manifold to determine the device pose at a given moment in time. However, such single SE(3) splines inaccurately model device movement. Specifically, a single SE(3) spline, generated by aggregating IMU data, is typically curved when there is rotational velocity and no translational acceleration where it should be a straight line given that there is no translational acceleration. As such, both approaches result in inaccurate determination of the device pose at a given moment in time which negatively impacts the overall user experience.

The disclosed embodiments improve the efficiency of using the electronic device by separately modeling device location and orientation to determine the device pose. As referred to herein, "device pose" means the orientation, spatial position, speed, acceleration, height, or any other physical movement related information associated with a given device. The separate modeling of the device location and orientation provides accurate determination of the device pose and allows the system to accurately generate one or more virtual objects for presentation in a VR or AR application. Specifically, the disclosed embodiments use a continuous pose trajectory based on translational and rotational spline formulations to estimate a device pose at a given time point. Because separate splines are used for the translational and rotational motions of the device, errors can be modeled in the domain they occur (e.g., acceleration errors are minimized in the domain of acceleration and do not need to be twice integrated). This allows for any measurement noise model to be used in a non-complex manner which increases the computational efficiency of determining device pose. Also, by modeling rotation and translation separately, fewer rotation parameters are needed than translation parameters, allowing the system to model accelerations and rotational velocities with similar precision in a more computationally efficient manner than using a single spline that represents both rotation and translation. As referred to herein, "spline" means a piecewise polynomial parametric curve.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and an AR/VR application 105. Each messaging client application 104 is communicatively coupled to other instances of the messaging client application 104, the AR/VR application 105, and a messaging server system 108 via a network 106 (e.g., the Internet).

Accordingly, each messaging client application 104 and AR/VR application 105 is able to communicate and exchange data with another messaging client application 104 and ARI/VR application 105 and with the messaging server system 108 via the network 106. The data exchanged between messaging client applications 104, AR/VR applications 105, and between a messaging client application 104 and the messaging server system 108 includes functions (e.g., commands to invoke functions) as well as payload data (e.g., text, audio, video, or other multimedia data).

The AR/VR application 105 is an application that includes a set of functions that allow the client device 102 to access the device pose estimation system 124. In some implementations, the AR/VR application 105 is a component or a feature that is part of the messaging client application 104. AR/VR application 105 includes an application that overlays graphics (e.g., an avatar or virtual objects) on top of an image or video depicting a real-world scene. The graphics are adjusted in real-time as the client device 102 moves around to change the orientation of the graphics with respect to the real-world scene depicted in the image or video being captured by the client device 102. This gives the illusion to the user that the graphics are physically present in the real-world scene.

Accurate adjustment of the orientation and position of the graphics is performed in conjunction with a device pose estimation system 124 (which may be implemented on client device 102). As the client device 102 receives sensor data from one or more sensors (e.g., accelerometers, magnetometers, GPS receivers, gyros, etc.), the client device 102 generates and updates splines (e.g., translational and rotational splines) that represent the location and orientation of the client device 102. In some embodiments, a third spline is generated and updated that represents bias of each of the one or more sensors. The splines are used by the client device 102 to generate a motion model of the orientation and location of the device in a 3D world coordinate system. The motion model is used to compute an expected orientation or location of the device (e.g., an expected reading from the one or more sensors of the client device 102). Specifically, the splines (e.g., the translational spline, the rotational spline, and the bias spline(s)) together allow the client device 102 to synthesize noiseless measurements expected by a given device motion. The expected orientation or location is used to make changes to the graphics displayed by the AR/VR application 105.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects or graphics, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and/or the AR/VR application 105 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., a story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and a device pose estimation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the device pose estimation system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114.

Figure 2:
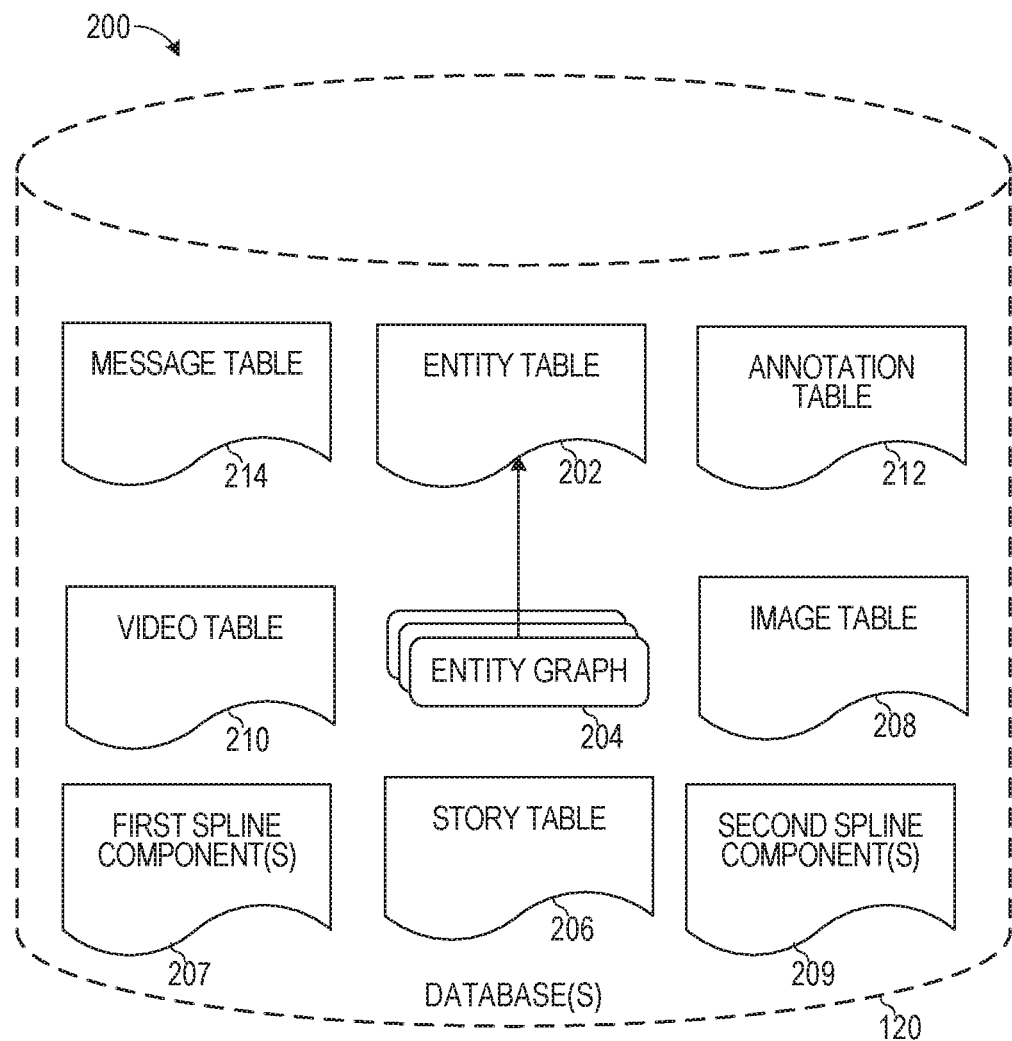
FIG. 2 is a schematic diagram illustrating data which may be stored in the database of a messaging server system, according to example embodiments.

FIG. 2 is a schematic diagram 200 illustrating data which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

First spline component(s) 207 stores components representing different segments of a spline. For example, the first spline component(s) 207 represents components of a translational spline (e.g., a quintic hermite spline) indicating the location of a sensor. In such circumstances, the components stored in the first spline component(s) 207 include a matrix representing 3D translations, a matrix representing velocities, and a matrix representing accelerations of the associated sensor relative to the world coordinate frame or system. These matrices may be stored for each time point in a given time interval.

Second spline component(s) 209 stores components representing different segments of a spline. For example, the second spline component(s) 209 represents components of a rotation spline (e.g., a cubic hermite spline) indicating the orientation of a sensor. In such circumstances, the components stored in the second spline component(s) 209 include a matrix representing 3D rotations from the world coordinate frame to the device coordinate frame and a matrix representing rotational velocity (in rad/s) of the device around its principal axes. These matrices may be stored for each time point in a given time interval. Second spline component(s) 209 may also store one or more linear bias splines representing sensor biases at different points in time.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story." which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
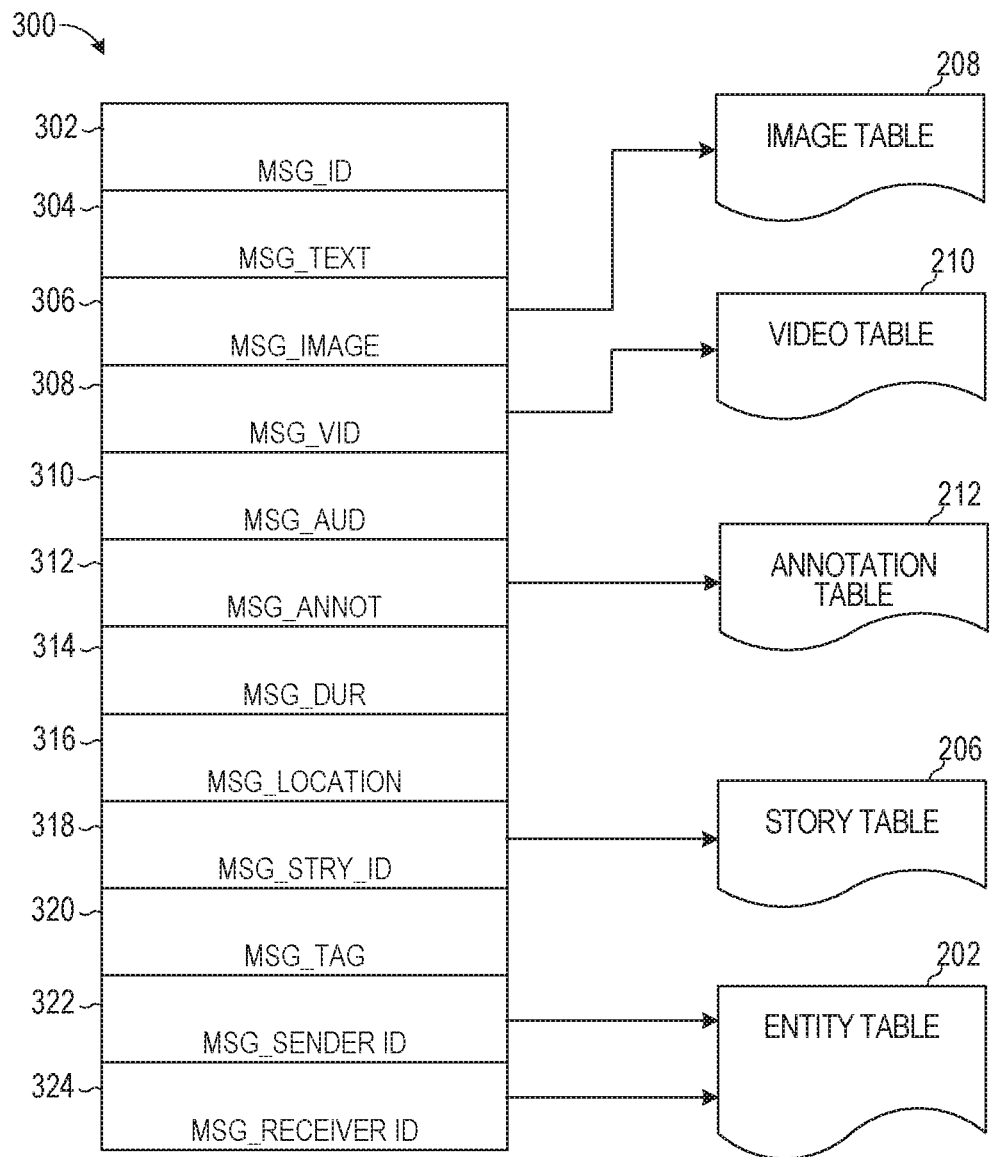
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message 300 (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message 300. Multiple message geolocation parameter 316 values may be included in the payload, with each of these parameter values being associated with respect to content items included in the content (e.g., a specific image within the message image payload 306, or a specific video in the message video payload 308).
- A message story identifier 318: an identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
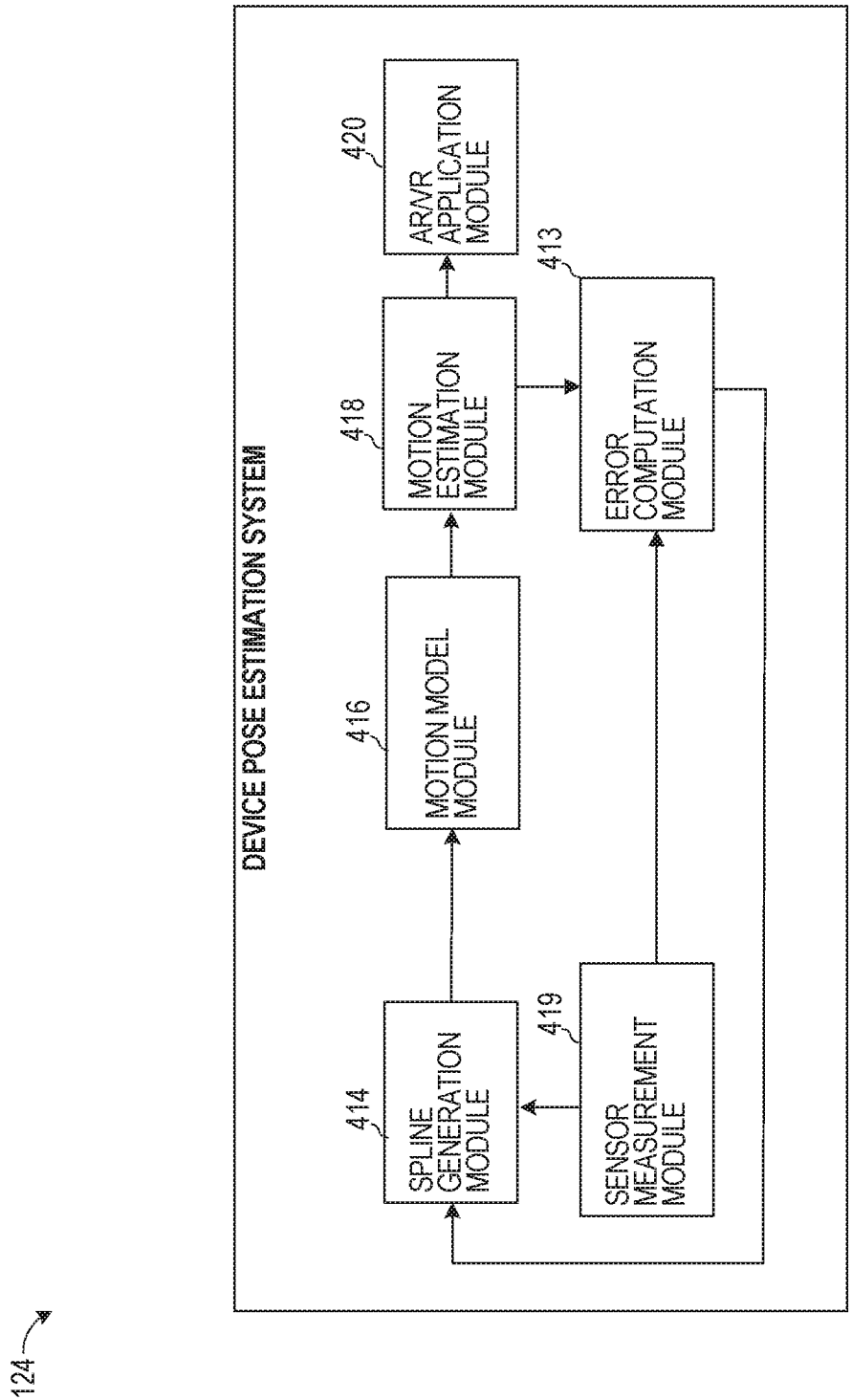
FIG. 4 is a block diagram showing an example device pose estimation system, according to example embodiments.

FIG. 4 is a block diagram showing an example device pose estimation system 124, according to example embodiments. Device pose estimation system 124 includes a sensor measurement module 419, a spline generation module 414, a motion model module 416, a motion estimation module 418, an error computation module 413, and an AR/VR application module 420.

Sensor measurement module 419 communicates with one or more sensors of a client device 102 to obtain a current reading of data from the one or more sensors. For example, the sensor measurement module 419 communicates with a gyro sensor to obtain a current measure of rotational velocity of the client device 102 at a given time. As another example, the sensor measurement module 419 communicates with an accelerometer sensor to obtain a current measure of translational acceleration of the client device 102 at a given time. The data obtained from the sensors by the sensor measurement module 419 are communicated to the spline generation module 414.

In some embodiments, at the start of the AR/VR application 105, the sensor measurement module 419 collects a set of initial sensor readings from each of the sensors of the client device 102. These initial sensor readings are used by the spline generation module 414 to begin generating splines that respectively represent location, orientation and bias associated with each sensor and the client device 102. For example, the spline generation module 414 initializes parameters of first segments of each spline using the initial sensor readings. In some embodiments, rather than obtaining a current reading during initialization from a given sensor, static motion of the device is assumed in generating the first segment of each spline. In another embodiment, a course grid search over possible motions is performed (e.g., a plurality of coarse motion estimates are computed) by the spline generation module 414 to generate a spline and the motion corresponding to the lowest squared errors or which minimizes to the lowest squared errors is selected as the first segment of the splines.

Spline generation module 414 generates a plurality of splines. A first of the splines generated by spline generation module 414 is a quintic hermite spline corresponding to a translational spline representing location of a given sensor in a world coordinate frame or system over a continuous time interval. A segment of the first spline may be defined by two control points: $[X_0, \dot{X}_0, \ddot{X}_0]$ and $[X_1, \dot{X}_1, \ddot{X}_1]$ at times $t_0$ and $t_1$, respectively. As time progresses, additional segments are generated (e.g., a segment for times $t_1$ to $t_2$). The initial values of the two control points are determined during initialization (e.g., by assuming static motion or performing a course grid search of motions). These segments are joined together to form the first spline. $X, \dot{X}, \ddot{X} \in \mathbb{R}^3$ represent 3D translations, velocities, and accelerations in the world coordinate frame, respectively. These translations at time $t \in [t_0, t_1]$ are computed in accordance with the following Equations 1-3:

$$X_t = [\dot{X}_0 u, \ddot{X}_0 u^2, X_1 - X_0, \dot{X}_1 u, \ddot{X}_1 u^2] \begin{bmatrix} 1 & 0 & -6 & 8 & -3 \\ 0 & 0.5 & -1.5 & 1.5 & -0.5 \\ 0 & 0 & 10 & -15 & 6 \\ 0 & 0 & -4 & 7 & -3 \\ 0 & 0 & 0.5 & -1 & 0.5 \end{bmatrix} \begin{bmatrix} v \\ v^2 \\ v^3 \\ v^4 \\ v^5 \end{bmatrix} + X_0, \quad (1)$$

$$\dot{X}_t = [\dot{X}_0 u, \ddot{X}_0 u^2, X_1 - X_0, \dot{X}_1 u, \ddot{X}_1 u^2] \begin{bmatrix} 1 & 0 & -6 & 8 & -3 \\ 0 & 0.5 & -1.5 & 1.5 & -0.5 \\ 0 & 0 & 10 & -15 & 6 \\ 0 & 0 & -4 & 7 & -3 \\ 0 & 0 & 0.5 & -1 & 0.5 \end{bmatrix} \begin{bmatrix} 1 \\ 2v \\ 3v^2 \\ 4v^3 \\ 5v^4 \end{bmatrix} \frac{1}{u}, \quad (2)$$

$$\ddot{X}_t = [\dot{X}_0 u, \ddot{X}_0 u^2, X_1 - X_0, \dot{X}_1 u, \ddot{X}_1 u^2] \begin{bmatrix} 0 & -6 & 8 & -3 \\ 0.5 & -1.5 & 1.5 & -0.5 \\ 0 & 10 & -15 & 6 \\ 0 & -4 & 7 & -3 \\ 0 & 0.5 & -1 & 0.5 \end{bmatrix} \begin{bmatrix} 2 \\ 6v \\ 12v^2 \\ 20v^3 \end{bmatrix} \frac{1}{u^2}, \quad (3)$$

where $u = t_1 - t_0$ and $v = (t - t_0)/u$, where t represents the time between $t_0$ and $t_1$.

A second of the splines generated by spline generation module 414 is a cubic hermite spline corresponding to a rotation spline representing orientation of a given sensor in a world coordinate frame or system over a continuous time interval. A segment of the second spline may be defined by two control points: $\{R_0, \dot{r}_0\}$ and $\{R_1, \dot{r}_1\}$ at times $t_0$ and $t_1$, respectively. As time progresses, additional segments are generated (e.g., a segment for times $t_1$ to $t_2$). These segments are joined together to form the second spline. The initial values of the two control points are determined during initialization (e.g., by assuming static motion or performing a course grid search of motions). $R \in SO(3)$ (group of all rotations about the origin of 3D Euclidean space $\mathbb{R}^3$) represent 3D rotations from the world coordinate frame or system to the device coordinate frame as rotation matrices, and $\dot{r} \in \mathbb{R}^3$ is the rotational velocity (in rad/s) of the device around its principal axes. These rotation and rotational velocity at time $t \in [t_0, t_1]$ are computed in accordance with the following Equations 4-10:

$$\begin{bmatrix} w_1 \\ w_2 \\ w_3 \end{bmatrix} = \begin{bmatrix} 1 & -2 & 1 \\ 0 & 3 & -2 \\ 0 & -1 & 1 \end{bmatrix} \begin{bmatrix} v \\ v^2 \\ v^3 \end{bmatrix} \quad (4)$$

$$A_1 = \text{exp}m(uw_1\dot{r}_0) \quad (5)$$

$$A_2 = \text{exp}m(w_2 \log m(R_1 R_0^T)) \quad (6)$$

$$A_3 = \text{exp}m(uw_2\dot{r}_1) \quad (7)$$

$$R_1 = A_3 A_2 A_1 R_0, \quad (8)$$

$$\begin{bmatrix} x_1 \\ x_2 \\ x_3 \end{bmatrix} = \begin{bmatrix} 1 & -2 & 1 \\ 0 & 3 & -2 \\ 0 & -1 & 1 \end{bmatrix} \begin{bmatrix} 1 \\ 2v \\ 3v^2 \end{bmatrix} \frac{1}{v} \quad (9)$$

$$\dot{r}_t = ux_3\dot{r}_1 + Ad[A_3](x_2 \log m(R_1 R_0^T) + Ad[A_2](ux_2\dot{r}_0)), \quad (10)$$

where $Ad[\bullet]$ is the matrix adjoint, $u = t_1 - t_0$ and $v = (t - t_0)/u$, where t represents the time between $t_0$ and $t_1$. The matrix exponential, exp $m(\bullet)$ for rotation tangent vector is given in closed form by Rodrigues's formula and the inverse operation, the matrix logarithm log $m(\bullet)$ is known in closed form for SO(3).

A third of the splines generated by spline generation module 414 include bias splines which may be linear splines. A separate bias spline may be generated for each different sensor of client device 102. The values of the bias splines at times $t_0$ and $t_1$ are $b_0$ and $b_1$, respectively, and the bias at time $t \in [t_0, t_1]$ is computed in accordance with Equation 11:

$$b_t = b_0 + (b_1 - b_0)v. \quad (11)$$

As mentioned above, the splines generated by spline generation module 414 may include multiple segments. For example, a spline of N segments can be defined by N+1 control points, ordered temporally, such that the $i^{th}$ segment is defined by control points at times $t_{i-1}$ and $t_i$. In this way, control points influence the shape of spline segments on either side and ensure continuity of the spline between consecutive segments. The first, second and third splines may use control points at different times t or may all be synchronized such that their respective control points are associated with and overlap with the same time points.

Sensors on the client device 102 can be physically placed at different locations on the client device 102. As such, any measurements received from the sensors are measured with respect to the coordinate frame or the physical position of the given sensor. Such measurements may be adjusted based on a fixed offset (rotation and translation) from the client device's 102 coordinate frame in order to align the measurements from the various sensors into a common world reference coordinate system. The offsets used to adjust the measurements may be fixed using a calibration process or left as a set of global variables and optimized over.

In some embodiments, the device reference frame for the translation spline (e.g., the first spline) is centered on the accelerometer. By doing so, the offset for the accelerometer coordinate frame with respect to the device or world reference frame becomes the identity pose. This prevents rotations of the device coordinate frame from inducing any accelerations in the accelerometer coordinate frame thereby simplifying the acceleration measurement performed by the motion estimation module 418.

In some embodiments, in the hermite spline, the control points sit on the spline itself. In this way, at times coinciding with control points (e.g., when $t=t_1$), the device pose and its derivatives are defined by only one control point. Visual or GPS measurement timeframes can be synchronized with measurement control points such that those measurement errors only depend on one control point, not two, further simplifying computation.

Motion model module 416 computes a motion model representing orientation or location of the client device 102. Specifically, motion model module 416 generates a model that combines the first, second and third splines generated by the spline generation module 414. This allows the motion estimation module 418 to estimate the device orientation or location (e.g., predict an upcoming measurement) for a future time point. For example, if the splines include segments for times $t_0$ to $t_1$, the motion model module 416 generates a model that enables motion estimation module 418 to estimate an orientation or location value at time $t_2$. The estimate may be determined by extrapolating the current spline or by integrating new measurements.

For example, for a gyroscope (which measures rotational velocity), the motion model module 416 may compute a motion model representing rotational velocity at time t using the second and third splines in accordance with Equation 12:

$$m_t^g = \dot{r}_t + b_t^g, \tag{12}$$

where $b_t^g \in \mathbb{R}^3$ is a vector of biases for each gyro axis at time t. Similarly, for an accelerometer (which measures translational acceleration of a device), the motion model module 416 may compute a motion model representing acceleration at time t using the first, second and third splines in accordance with Equation 13:

$$m_t^a = R_t(\ddot{X}_t + [0,0,y]^T) + b_t^a, \tag{13}$$

where $b_t^a \in \mathbb{R}^3$ is a vector of biases for each accelerometer axis at time t and g is the acceleration due to gravity, which can be fixed (or looked up) or variable, as needed.

The motion estimation module 418 estimates an orientation or location of the client device 102 using one or more of the models provided by the motion model module 416. This allows the device pose estimation system 124 to determine a device pose of the client device 102 (e.g., orientation or location) in real time. Specifically, the motion estimation module 418 may initialize new segments of the first, second and/or third splines to model or estimate new sensor measurements. The motion estimation module 418 may generate new control points for one or more of the splines by extrapolating the current spline segments or by integrating new measurements. Computational complexity can be kept constant or minimized by fixing previous control points, marginalizing previous measurements into a prior on the first variable control point, or dropping old measurements altogether.

The estimated measurement or the estimated device pose may be provided to the AR/VR application module 420. The AR/VR application module 420 may adjust parameters of a graphic (e.g., a virtual object) based on a new device orientation and position. Namely, the orientation and location of the graphic may be changed relative to the real-world scene depicted in the live or recorded image or video. In some embodiments, the AR/VR application module 420 may communicate the estimated new device orientation and position to the client device 102 and the AR/VR application 105 on the client device 102 may make the necessary adjustments to the graphics overlaid in the image or video.

Other applications besides AR/VR applications 105 can use the estimated measurements generated by the motion estimate module 418. For example, a rolling camera shutter can adjust the images captured along a given axis based on the estimated motion measurements. Specifically, the rolling camera shutter captures an image by capturing rows of pixels sequentially in time. There may be motion of the client device 102 using the rolling camera between each row capture. Accordingly, to accommodate for changes in the image being captured due to movement of the device between row captures, the estimated motion capture can be used to estimate what the motion will be at a given time when a given row is being captured. This can be used to offset the row of pixels being captured to account for the estimated motion.

The estimated measurement or the estimated device pose computed by the motion estimation module 418 is provided to the error computation module 413. Error computation module 413 compares the estimated device pose or estimated measurement with a corresponding real measurement received from one of the sensors from sensor measurement module 419. The error computation module 413 provides a result of this comparison to the spline generation module 414 to adjust the estimated or extrapolated segment of each of the splines. Namely, the spline generation module 414 may mark estimated spline segments to be verified based on actual measurements and based on the error provided by the error computation module 413, the marked segments may be verified or corrected to reflect the actual measurements. This allows subsequent estimations for later time points to be more accurately represented.

In some implementations, the error computation module 413 computes the measurement errors by subtracting the estimated (or synthesized) measurements from the real measurements. Assuming a Gaussian noise model is used, the cost functions associated with these errors may be computed in accordance with Equations 14 and 15:

$$E_t^g = \left|\frac{m_t^g - \hat{m}_t^g}{2\sigma_g^2}\right|^2, \tag{14}$$

$$E_t^a = \left|\frac{m_t^a - \hat{m}_t^a}{2\sigma_a^2}\right|^2, \tag{15}$$

where $\dot{m}_t^g$ and $\dot{m}_t^a$ are the real gyroscope and accelerometer measurements received at time t from sensor measurement module 419 and $\sigma_g$ and $\sigma_a$ are the standard deviations of measurement noise for the gyroscope and accelerometer, respectively. The $m_t^g$ and $m_t^a$ are the estimated gyroscope and accelerometer measurements for time t as computed based on the motion model provided by the motion model module 416.

The maximum likelihood estimate for the trajectory of each spline can be determined by minimizing the cost functions of Equations 14-15 with respect to the set of all variable parameters, θ. Specifically, letting $T^g$ and $T^a$ be the sets of timestamps for gyroscope and accelerometer measurements, respectively. The optimization problem can be represented by Equation 16:

$$\theta = \underset{\theta^*}{\operatorname{argmin}} \sum_{t \in T^g} E_t^g + \sum_{t \in T^a} E_t^a. \quad (16)$$

A non-linear least square solver such as the Levenberg-Marquardt algorithm or any other suitable linear regression can be used to solve the optimization problem. Other cost functions, such as those pertaining to visual odometry constraints or GPS measurements can be added to the total cost function prior to optimization.

Translational scale can be ambiguous for some time during measurement fusion (e.g., if fusing image measurements in a visual-inertial odometry framework). In such circumstances, an additional global scale parameter can be added to the optimization problem which is constrained by prior distribution that is updated as older measurements are marginalized out. This allows modeling uncertainty in scale while fixing past control points.

Figure 5:
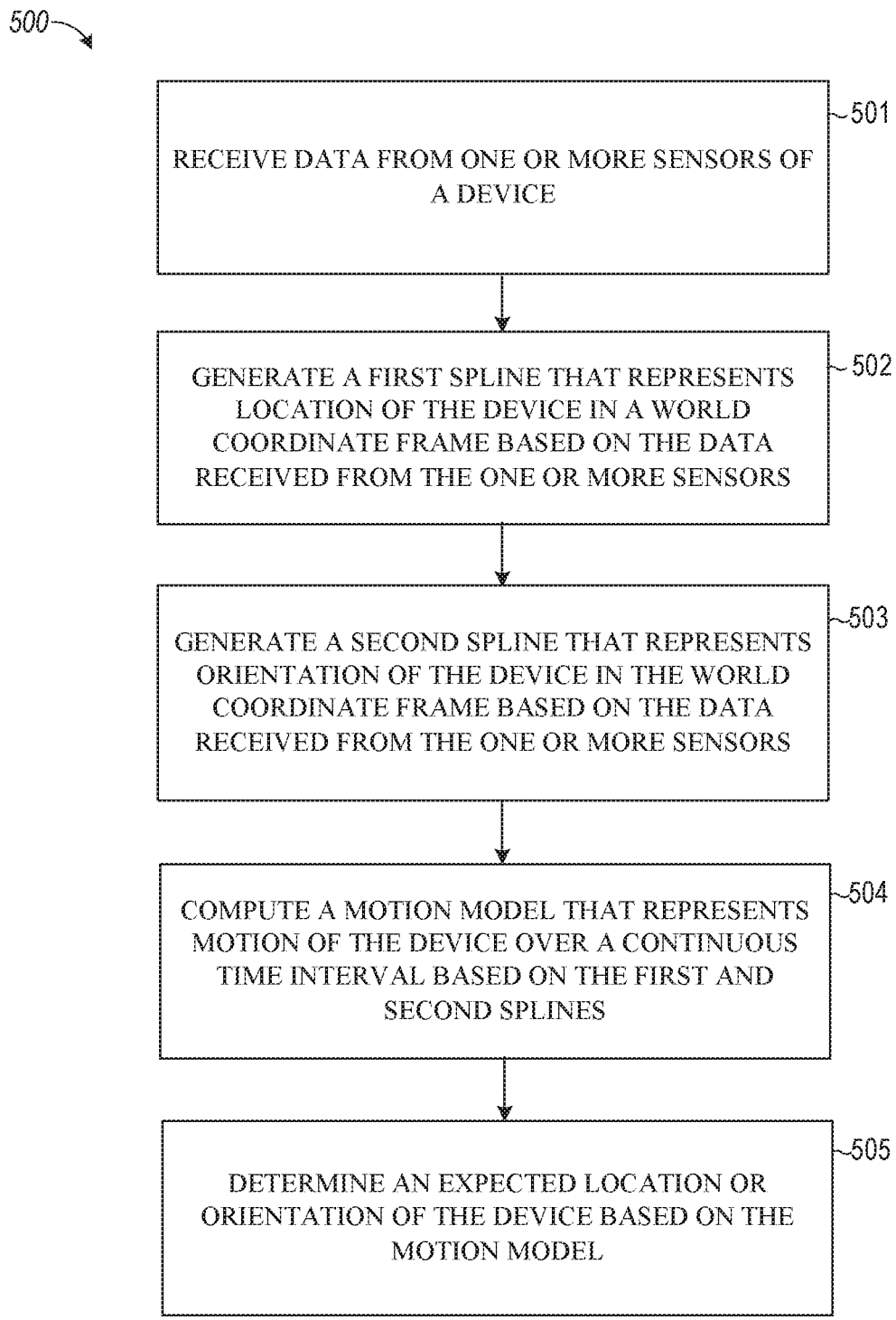
FIG. 5 is a flowchart illustrating example operations of the device pose estimation system, according to example embodiments.

FIG. 5 is a flowchart illustrating example operations of the device pose estimation system 124 in performing process 500, according to example embodiments. The process 500 may be embodied in computer-readable instructions for execution by one or more processors such that the operations of the process 500 may be performed in part or in whole by the functional components of the messaging server system 108 and/or AR/VR application 105; accordingly, the process 500 is described below, by way of example, with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the device pose estimation system 124 receives data from one or more sensors of a device. For example, the sensor measurement module 419 receives measurements from an accelerometer and a gyro in a client device 102. These measurements are provided to the spline generation module 414.

At operation 502, the device pose estimation system 124 generates a first spline that represents the location of the device in a world coordinate frame based on the data received from the one or more sensors. For example, the spline generation module 414 generates a first translation spline that is a quintic hermite spline representing 3D translations, velocities and accelerations of the client device 102.

At operation 503, the device pose estimation system 124 generates a second spline that represents orientation of the device in the world coordinate frame based on the data received from the one or more sensors. For example, the spline generation module 414 generates a second rotation spline that is a cubic hermite spline representing 3D rotations and rotational velocity of the client device 102.

At operation 504, the device pose estimation system 124 computes a motion model that represents motion of the device over a continuous time interval based on the first and second splines. For example, motion model module 416 computes a motion model by considering together the splines provided by the spline generation module 414.

At operation 505, the device pose estimation system 124 determines an expected location or orientation of the device based on the motion model. For example, the motion estimation module 418 uses the motion model provided by the motion model module 416 to estimate orientation or location of the device at a given time.

Figure 6:
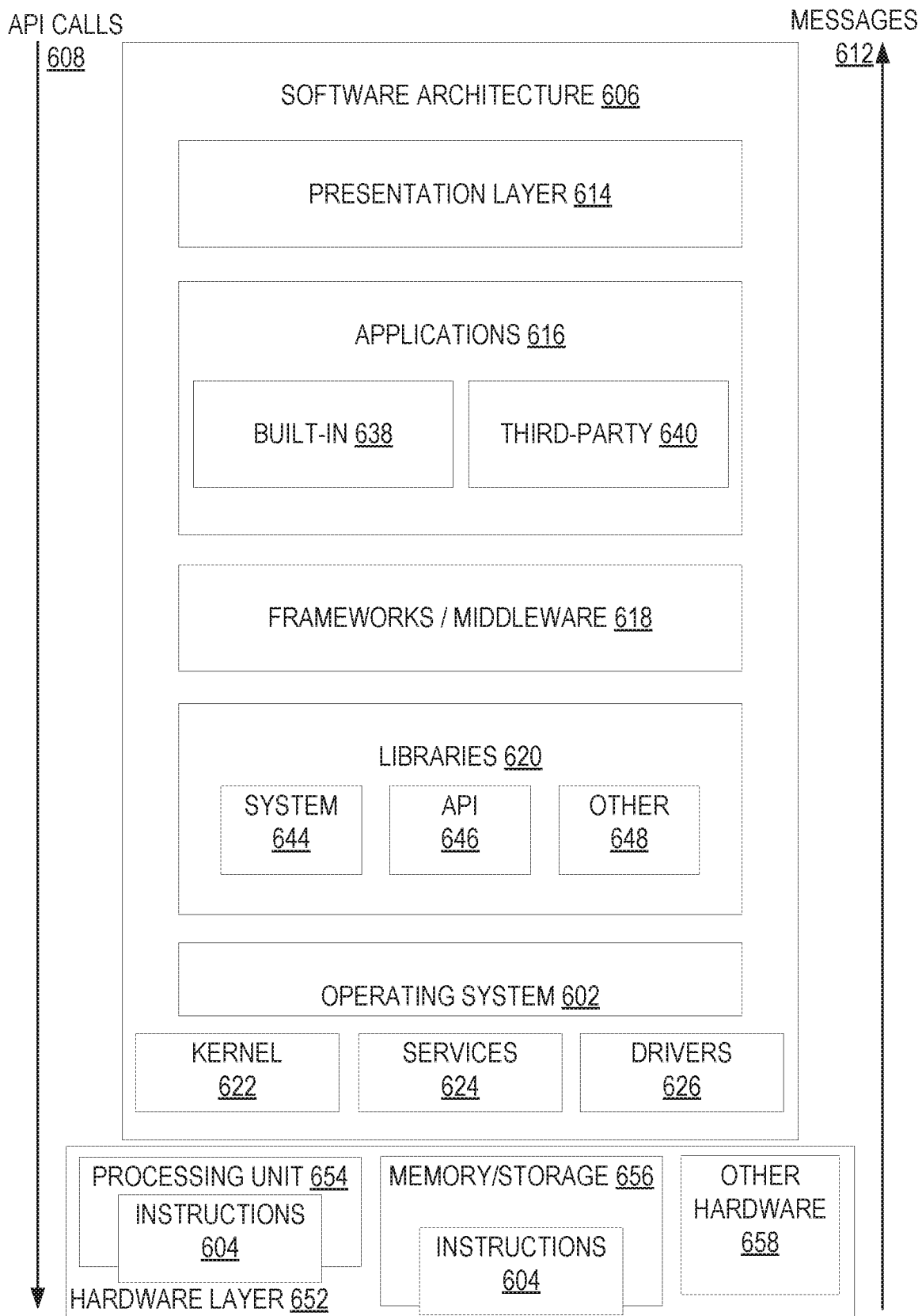
FIG. 6 is a block diagram illustrating a representative software architecture, which may be used in conjunction with various hardware architectures herein described, according to example embodiments.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems 602 may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3. AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic UI (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
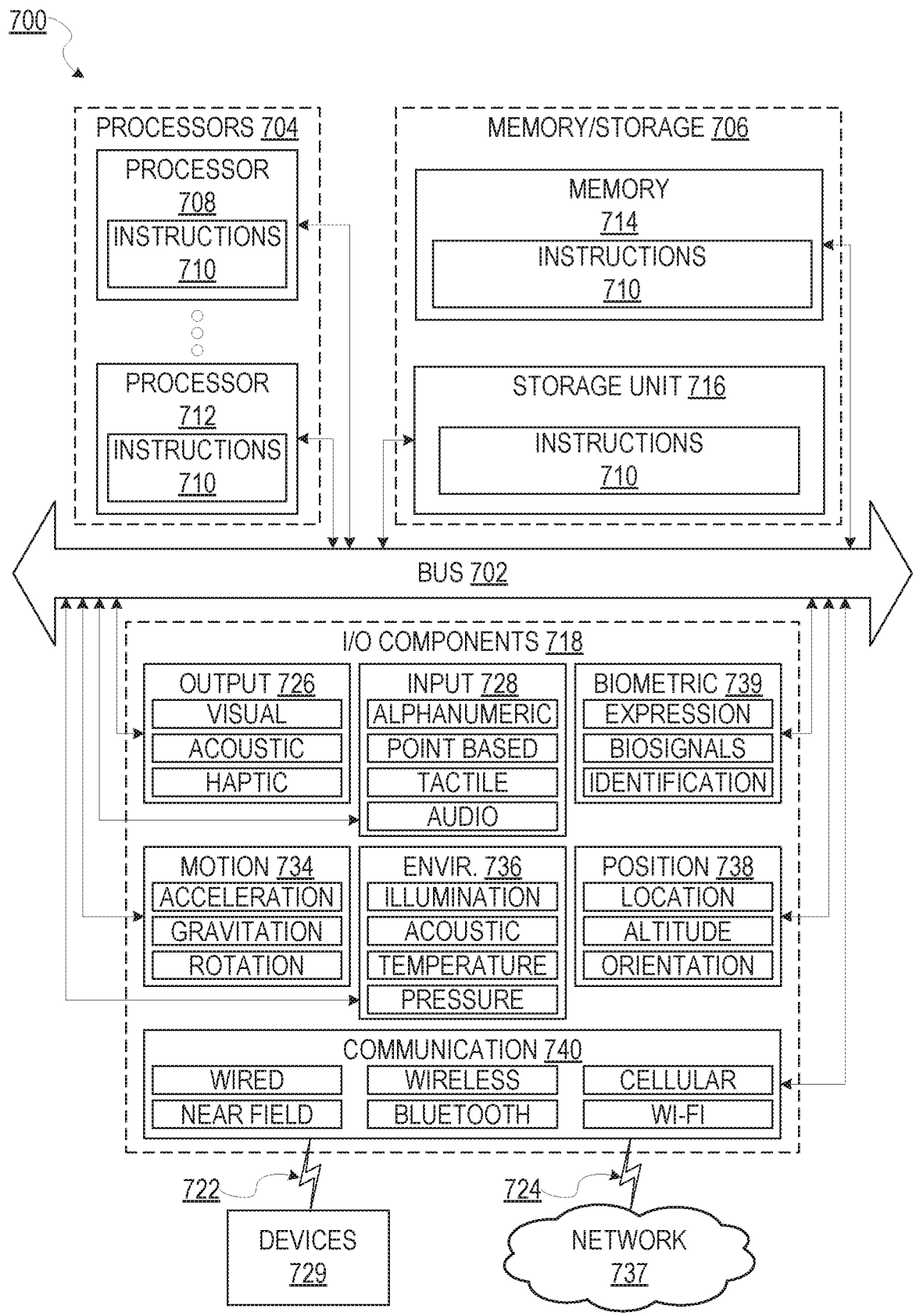
FIG. 7 is a block diagram illustrating components of a machine able to read instructions from a machine-readable medium (e.g., a machine-readable storage medium) and perform any one or more of the methodologies discussed herein, according to example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor 708 with a single core, a single processor 708 with multiple cores (e.g., a multi-core processor), multiple processors 704 with a single core, multiple processors 704 with multiple cores, or any combination thereof.

The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 729 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions 710 for execution by the machine 700, and includes digital or analog communications signals or other intangible medium to facilitate communication of such instructions 710. Instructions 710 may be transmitted or received over the network 737 using a transitory or non-transitory transmission medium via a network interface device and using any one of a number of well-known transfer protocols.

"CLIENT DEVICE" in this context refers to any machine 700 that interfaces to a communications network 737 to obtain resources from one or more server systems or other client devices 102. A client device 102 may be, but is not limited to, a mobile phone, desktop computer, laptop. PDAs, smart phones, tablets, ultra books, netbooks, laptops, multi-processor systems, microprocessor-based or programmable consumer electronics, game consoles, set-top boxes, or any other communication device that a user may use to access a network 737.

"COMMUNICATIONS NETWORK" in this context refers to one or more portions of a network 737 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM" in this context refers to a component, device, or other tangible media able to store instructions 710 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 708 or other programmable processor. Once configured by such software, hardware components become specific machines 700 (or specific components of a machine 700) uniquely tailored to perform the configured functions and are no longer general-purpose processors 710. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 708 configured by software to become a special-purpose processor, the general-purpose processor 708 may be configured as respectively different special-purpose processors (e.g., comprising different hardware components) at different times. Software accordingly configures a particular processor or processors 708, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 737 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 708) that manipulates data values according to control signals (e.g., "commands," "op codes." "machine code.", etc.) and which produces corresponding output signals that are applied to operate a machine 700. A processor 708 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 708 may further be a multi-core processor having two or more independent processors 704 (sometimes referred to as "cores") that may execute instructions 710 contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by one or more processors of a virtual reality or augmented reality (VR/AR) device comprising a VR/AR environment in a three-dimensional (3D) display, data from one or more sensors of the VR/AR device, the VR/AR device being configured to generate an object in the VR/AR environment by causing operations to be performed comprising:
   generating, by the one or more processors, a first spline that represents a location of the device in a world coordinate frame based on the data received from the one or more sensors;
   generating, by the one or more processors, a second spline that represents an orientation of the device in the world coordinate frame based on the data received from the one or more sensors;
   computing, by the one or more processors, a motion model that represents motion of the device over a continuous time interval based on the first and second splines; and
   determining, by the one or more processors, an expected location or orientation of the device based on the motion model, the determining comprising extrapolating one or more points on the first spline or the second spline; and
   adjusting, by the one or more processors, a visual property of the object based on the expected location or orientation of the AR/VR device.

2. The method of claim 1, wherein the one or more sensors includes one or more of an accelerometer, a gyro, a GPS receiver, and a magnetometer.

3. The method of claim 1, wherein the first spline comprises a quintic hermite spline representing translation.

4. The method of claim 3, wherein the first spline includes a plurality of components representing motion attributes in the world coordinate frame, wherein a first of the plurality of components represents three-dimensional translations, wherein a second of the plurality of components represents velocities, and wherein a third of the plurality of components represents accelerations.

5. The method of claim 3, wherein the second spline comprises a cubic hermite spline representing rotation.

6. The method of claim 5, wherein the second spline includes a plurality of components representing motion attributes in the world coordinate frame, wherein a first of the plurality of components represents three-dimensional rotations, and wherein a second of the plurality of components represents rotational velocity around principal axes of the device.

7. The method of claim 1, wherein the device includes at least one of a mobile phone, an image capture device, a headset comprising an image capture device, or a head-mounted display.

8. The method of claim 1, further comprising:
   capturing an image using the device depicting a real-world scene;
   overlying a virtual object on a portion of the image captured by the device; and
   orienting the virtual object relative to the real-world scene depicted in the image based on the motion model.

9. The method of claim 1, further comprising generating a third spline that represents a bias of each of the one or more sensors in at least a portion of the continuous time interval.

10. The method of claim 9, wherein the third spline comprises a linear spline.

11. The method of claim 1, wherein a device reference frame for the first spline is centered on the one or more sensors.

12. The method of claim 1, wherein the expected location or orientation corresponds to a given time point on the continuous time interval, further comprising:
    receiving a measurement from the one or more sensors representing orientation or location of the device at the given time point; and
    computing an error between the received measurement representing the orientation or location and the expected location or orientation.

13. The method of claim 12, further comprising updating the motion model based on the computed error.

14. The method of claim 12, wherein the measurement is received from two of the one or more sensors, wherein the expected location or orientation corresponds to first and second expected measurements of the two of the one or more sensors, and wherein the error represents respective errors between the first and second expected measurements and the received measurements, wherein computing the error comprises minimizing a cost function of the respective errors.

15. The method of claim 1, further comprising synchronizing the first and second splines such that control points of the first and second splines correspond to a same set of time points.

16. The method of claim 1, further comprising synchronizing GPS or visual measurement time frames with a control point of the first spline or the second spline.

17. A system comprising:
- a processor of a virtual reality or augmented reality (VR/AR) device comprising a VR/AR environment in a three-dimensional (3D) display configured to perform operations comprising:
- receiving data from one or more sensors of the VR/AR device, the VR/AR device being configured to generate an object in the VR/AR environment by causing operations to be performed comprising:
- generating a first spline that represents a location of the device in a world coordinate frame based on the data received from the one or more sensors;
- generating a second spline that represents orientation of the device in the world coordinate frame based on the data received from the one or more sensors;
- computing a motion model that represents motion of the device over a continuous time interval based on the first and second splines; and
- determining an expected location or orientation of the device based on the motion model, the determining comprising extrapolating one or more points on the first spline or the second spline; and
- adjusting a visual property of the object based on the expected location or orientation of the AR/VR device.

18. The system of claim 17, wherein the operations further comprise generating a third spline that represents bias of each of the one or more sensors in at least a portion of the continuous time interval.

19. A non-transitory machine-readable storage medium that includes instructions that, when executed by one or more processors of a machine, cause the machine to perform operations comprising:
- receiving data from one or more sensors of an VR/AR device, the VR/AR device being configured to generate an object in an VR/AR environment by causing operations to be performed comprising:
- generating a first spline that represents a location of the device in a world coordinate frame based on the data received from the one or more sensors;
- generating a second spline that represents an orientation of the device in the world coordinate frame based on the data received from the one or more sensors;
- computing a motion model that represents motion of the device over a continuous time interval based on the first and second splines; and
- determining an expected location or orientation of the device based on the motion model, the determining comprising extrapolating one or more points on the first spline or the second spline; and
- adjusting a visual property of the object based on the expected location or orientation of the AR/VR device.

* * * * *